(12) United States Patent
Koo

(10) Patent No.: US 10,605,183 B2
(45) Date of Patent: Mar. 31, 2020

(54) APPARATUS AND METHOD FOR CONTROLLING LOW-PRESSURE EGR SYSTEM

(71) Applicants: HYUNDAI MOTOR COMPANY, Seoul (KR); KIA MOTORS CORPORATION, Seoul (KR)

(72) Inventor: Bon-Chang Koo, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/834,655

(22) Filed: Dec. 7, 2017

(65) Prior Publication Data

US 2018/0328295 A1    Nov. 15, 2018

(30) Foreign Application Priority Data

May 12, 2017    (KR) .......................... 10-2017-0059139

(51) Int. Cl.
| | |
|---|---|
| *F02D 13/04* | (2006.01) |
| *F02D 41/00* | (2006.01) |
| *F02D 13/02* | (2006.01) |
| *F02M 26/01* | (2016.01) |
| *F02M 26/06* | (2016.01) |
| *F02M 26/00* | (2016.01) |

(52) U.S. Cl.
CPC ....... *F02D 41/006* (2013.01); *F02D 13/0215* (2013.01); *F02D 13/0261* (2013.01);
(Continued)

(58) Field of Classification Search
CPC ............. F02D 13/0207; F02D 13/0242; F02D 13/0246; F02D 2041/001
(Continued)

(56) References Cited

U.S. PATENT DOCUMENTS

| | | |
|---|---|---|
| 6,283,074 B1 | 9/2001 | Takahashi et al. |
| 2001/0050067 A1 | 12/2001 | Sato |

(Continued)

FOREIGN PATENT DOCUMENTS

| | | |
|---|---|---|
| FR | 3041999 A1 | 4/2017 |
| JP | 2000-328970 A | 11/2000 |

(Continued)

OTHER PUBLICATIONS

Search Report issued in European Patent Application No. 18155511.1, dated Aug. 22, 2018.

*Primary Examiner* — John Kwon
(74) *Attorney, Agent, or Firm* — Morgan, Lewis & Bockius LLP

(57) ABSTRACT

An apparatus for controlling a low-pressure EGR system may include a driving information detector configured to detect a vehicle driving state, an EGR amount detector configured to detect an amount of external EGR controlled by a low-pressure EGR valve, and a controller configured to control the low-pressure EGR valve and intake and exhaust valves of an engine, based on the result detected by the driving information detector and the EGR amount detector, wherein the controller controls timings of the intake and exhaust valves to decrease an amount of internal EGR introduced into a cylinder through an exhaust port for a predetermined time when the amount of external EGR is decreased.

10 Claims, 11 Drawing Sheets

(52) U.S. Cl.
CPC ....... *F02D 41/0005* (2013.01); *F02D 41/005* (2013.01); *F02D 41/0072* (2013.01); *F02M 26/01* (2016.02); *F02M 26/06* (2016.02); *F02D 2041/001* (2013.01); *F02D 2200/0404* (2013.01); *F02D 2200/101* (2013.01); *F02D 2200/501* (2013.01); *F02D 2200/602* (2013.01); *F02M 2026/001* (2016.02); *F02M 2026/003* (2016.02)

(58) Field of Classification Search
USPC .... 123/568.14, 568.15, 568.21, 568.26, 321, 123/322, 345–348
See application file for complete search history.

(56) References Cited

U.S. PATENT DOCUMENTS

| | | | | |
|---|---|---|---|---|
| 2004/0149263 | A1* | 8/2004 | Tanei | ........................ F01L 1/34 123/406.29 |
| 2009/0216427 | A1* | 8/2009 | Yamakawa | ......... F02D 13/0215 701/103 |
| 2012/0090584 | A1 | 4/2012 | Jung | |
| 2012/0316760 | A1* | 12/2012 | Grieser | ................. F02B 23/101 701/108 |
| 2014/0352670 | A1* | 12/2014 | Surnilla | ................. F02M 26/06 123/568.12 |
| 2015/0192079 | A1 | 7/2015 | Akagi et al. | |
| 2018/0266365 | A1* | 9/2018 | Aoyagi | ................. F02M 26/07 |

FOREIGN PATENT DOCUMENTS

| | | |
|---|---|---|
| JP | 2001-355462 A | 12/2001 |
| JP | 2007192157 A | 8/2007 |
| JP | 2011-174442 A | 9/2011 |
| KR | 10-0545960 B1 | 1/2006 |
| KR | 10-2012-0040050 A | 4/2012 |
| WO | 2016/017214 A1 | 2/2016 |

* cited by examiner

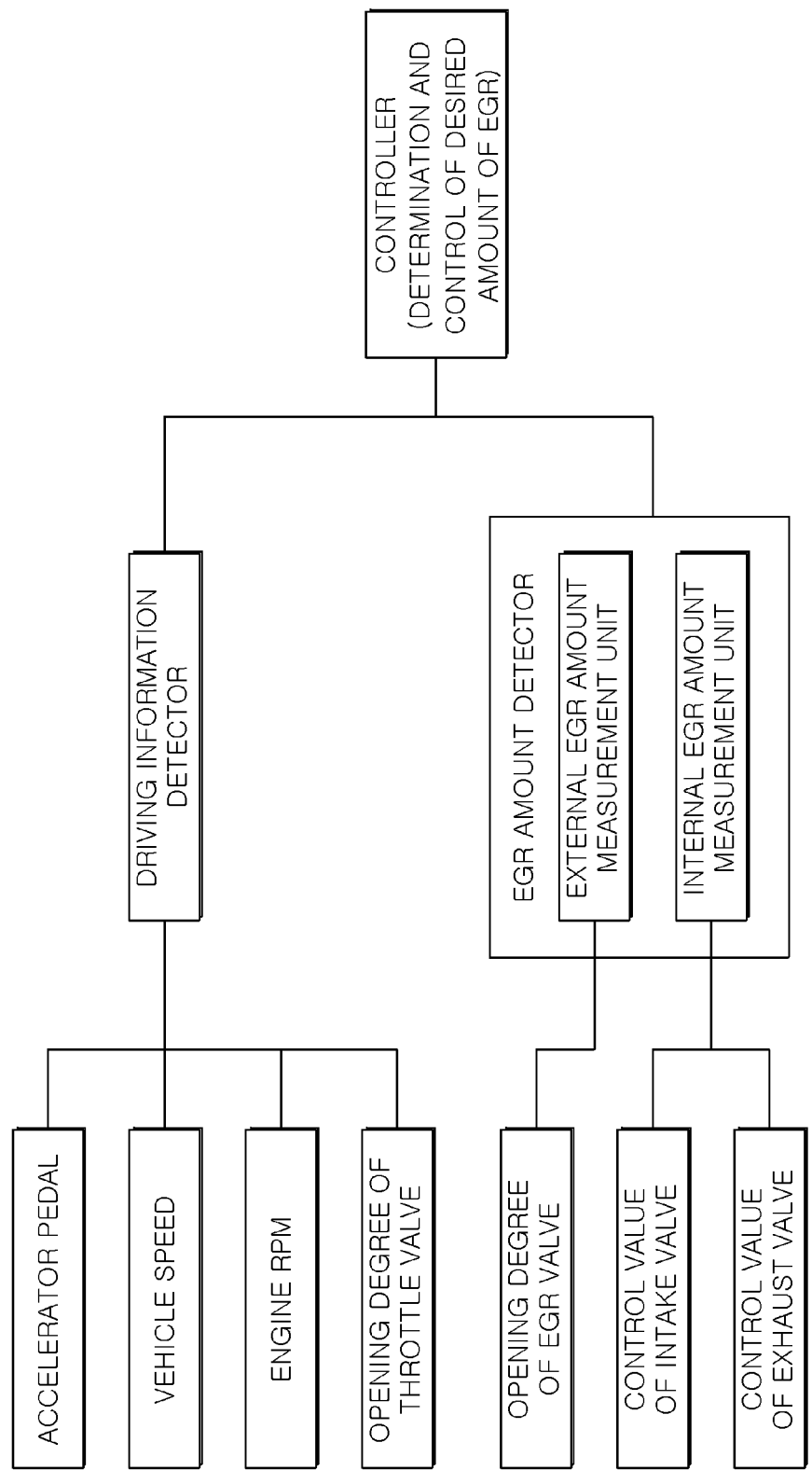

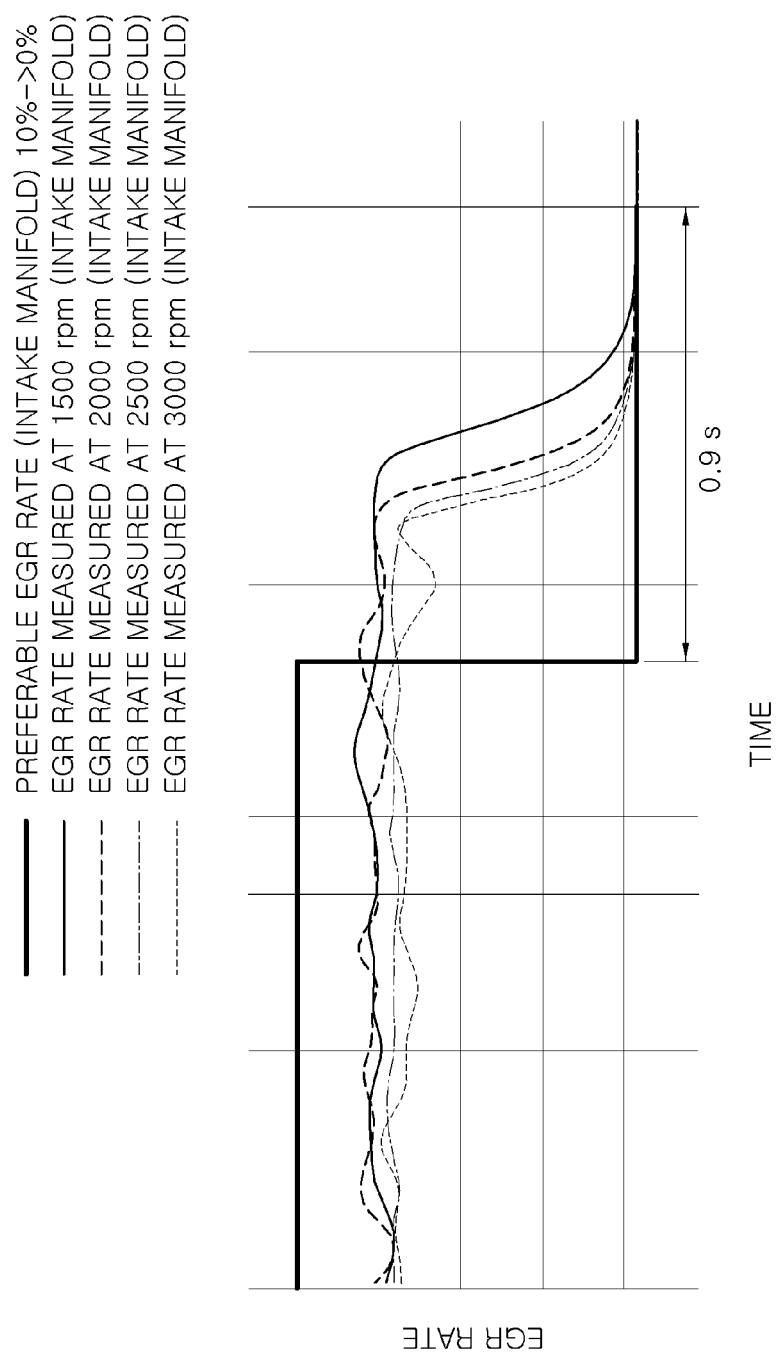

APPARATUS AND METHOD FOR CONTROLLING LOW-PRESSURE EGR SYSTEM

CROSS-REFERENCE(S) TO RELATED APPLICATIONS

This application claims priority to Korean Patent Application No. 10-2017-0059139, filed on May 12, 2017, which is incorporated herein by reference in its entirety.

BACKGROUND

Technical Field

Exemplary embodiments of the present disclosure relate to an apparatus and method for controlling a low-pressure EGR (Exhaust Gas Recirculation) system; and, particularly, to an apparatus and method for controlling a low-pressure EGR system, capable of resolving combustion instability due to unnecessary inflow of external EGR gas when the execution of low-pressure EGR is stopped.

Description of Related Art

In recent years, an internal combustion engine has been equipped with a low-pressure EGR system that recirculates a portion of exhaust gas to an intake system to lower a maximum temperature during combustion, thereby suppressing generation of NOx and improving fuel efficiency, as disclosed in Korean Patent Application Publication No. 2012-0040050 filed on Apr. 26, 2012. As illustrated in FIG. 8, such an EGR system is mainly operated in a region where the engine speed (RPM) is 1000 to 4000 rpm and the engine power is about 30 to 80%.

When a vehicle is driven out of the above operating region of low-pressure EGR, the execution of the low-pressure EGR is stopped with the consequence that exhaust gas, which is being introduced into an intake system by a low-pressure EGR, valve is not introduced thereinto any more. By way of example, when the engine speed reaches an idle RPM after occurrence of vehicle deceleration conditions while the amount of external EGR is being used such that the desired rate of EGR is up to 30% by the low-pressure EGR valve, the desired rate of EGR is changed to 0% so that the control of EGR is stopped. However, since the length of a recirculation pipe connected from the exhaust side to the intake side is long, the exhaust gas within the recirculation pipe is introduced, as it is, into a cylinder by inertia with the consequence that a larger amount of air than the calculated amount of air is introduced into the cylinder. Hence, the inflow of an unnecessary amount of EGR air into a combustion chamber may lead to combustion instability, thereby causing an accidental fire and a start-off phenomenon in the engine.

FIG. 7 is a graph illustrating the time required to completely stop inflow of exhaust gas for each engine speed when the desired rate of EGR is changed from 10% to 0% by control of a low-pressure EGR valve. It can be seen in FIG. 7 that the time at which external EGR gas is introduced into a cylinder is increased as the engine speed is low. In particular, when the engine speed is 1500 rpm, the time until the inflow of exhaust gas is completely stopped after the low-pressure EGR valve is controlled according to the change in the desired amount of EGR is delayed by 0.9 seconds. Hence, combustion instability occurs during the unnecessary inflow of external EGR gas into the cylinder, which causes an accidental fire and a start-off phenomenon.

SUMMARY

An embodiment of the present disclosure is directed to an apparatus and method for controlling a low-pressure EGR system, capable of resolving combustion instability due to unnecessary inflow of external EGR gas when the execution of low-pressure EGR is stopped.

Other objects and advantages of the present disclosure can be understood by the following description, and become apparent with reference to embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, an apparatus for controlling a low-pressure EGR system includes a driving information detector configured to detect a vehicle driving state, an EGR amount detector configured to detect an amount of external EGR controlled by a low-pressure EGR valve, and a controller configured to control the low-pressure EGR valve and intake and exhaust valves of an engine, based on the result detected by the driving information detector and the EGR amount detector, wherein the controller controls timings of the intake and exhaust valves to decrease an amount of internal EGR introduced into a cylinder through an exhaust port for a predetermined time when the amount of external EGR is decreased.

When the amount of external EGR is changed to "0" by stop of low-pressure EGR, the controller may control the timings of the intake and exhaust valves to decrease the amount of internal EGR.

The control for decreasing the amount of internal EGR may be performed by retarding the timing of the intake valve and advancing the timing of the exhaust valve to reduce a valve overlap.

The valve overlap may be reduced by retarding the timing of the intake valve from a top dead center by a predetermined angle and advancing the timing of the exhaust valve from the top dead center by a predetermined angle.

The angle of retard of the intake valve and the angle of advance of the exhaust valve may be in a range of 0° to 5°.

The driving information detector may detect at least one of an opening degree of a vehicle accelerator pedal, a vehicle speed, an engine speed (RPM), and an opening degree of a throttle valve.

The predetermined time, for which the amount of internal EGR is decreased, may be determined according to an engine speed detected by the driving information detector.

The control for decreasing the amount of internal EGR may be performed when a difference between a current rate of EGR and a desired rate of EGR based on the amount of external EGR detected by the EGR amount detector exceeds a critical value.

The control for decreasing the amount of internal EGR may be performed when an engine speed is in an idle RPM range.

The controller may control an ignition timing of an ignition coil and a torque by applying a control duty corresponding to a desired rate of EGR to the low-pressure EGR valve and detecting an amount of EGR air in low-pressure EGR using the EGR amount detector.

The controller may control a ratio between fuel and air supplied to the engine such that an excess air ratio (λ) is "1".

In accordance with another embodiment of the present disclosure, a method of controlling a low-pressure EGR system includes determining whether or not to stop low-pressure EGR, and controlling timings of intake and exhaust valves of an engine when the low-pressure EGR is stopped, to decrease an amount of internal EGR supplied into a cylinder of the engine from an exhaust port for a predetermined time by a valve overlap between the intake valve and the exhaust valve.

In accordance with another embodiment of the present disclosure, a method for controlling a low-pressure EGR system includes reducing a desired rate of EGR in low-pressure EGR, determining whether or not a difference between a current rate of EGR and the desired rate of EGR exceeds a critical value, and controlling timings of intake and exhaust valves of an engine when the difference between the current rate of EGR and the desired rate of EGR exceeds the critical value, to decrease an amount of internal EGR for a predetermined time by a valve overlap between the intake valve and the exhaust valve.

The determining whether or not to stop low-pressure EGR may be performed based on a vehicle driving state determined by detecting at least one of an opening degree of a vehicle accelerator pedal, a vehicle speed, an engine speed (RPM), and an opening degree of a throttle valve.

The controlling timings of intake and exhaust valves of an engine may be performed by retarding the timing of the intake valve by a predetermined angle and advancing the timing of the exhaust valve by a predetermined angle, for a predetermined time.

The controlling timings of intake and exhaust valves of an engine may be performed when an engine speed is in an idle RPM range.

The method may further include controlling a low-pressure EGR valve to a desired position to accomplish a desired amount of EGR when the low-pressure EGR is resumed, after the controlling timings of intake and exhaust valves of an engine is performed.

The method may further include controlling an ignition timing of the engine and a torque by detecting an amount of EGR air in the low-pressure EGR, after the controlling a low-pressure EGR valve to a desired position is performed.

In the controlling timings of intake and exhaust valves of an engine, an engine speed of a vehicle may be detected and the amount of internal EGR may be decreased for a time determined according to the detected engine speed.

BRIEF DESCRIPTION OF THE DRAWINGS

FIG. 4 is a block diagram illustrating a configuration of the apparatus for controlling a low-pressure EGR system according to an embodiment of the present disclosure.

FIG. 7 is a graph illustrating a change in amount of EGR depending on the time when low-pressure EGR is stopped.

DETAILED DESCRIPTION

Figure 1:
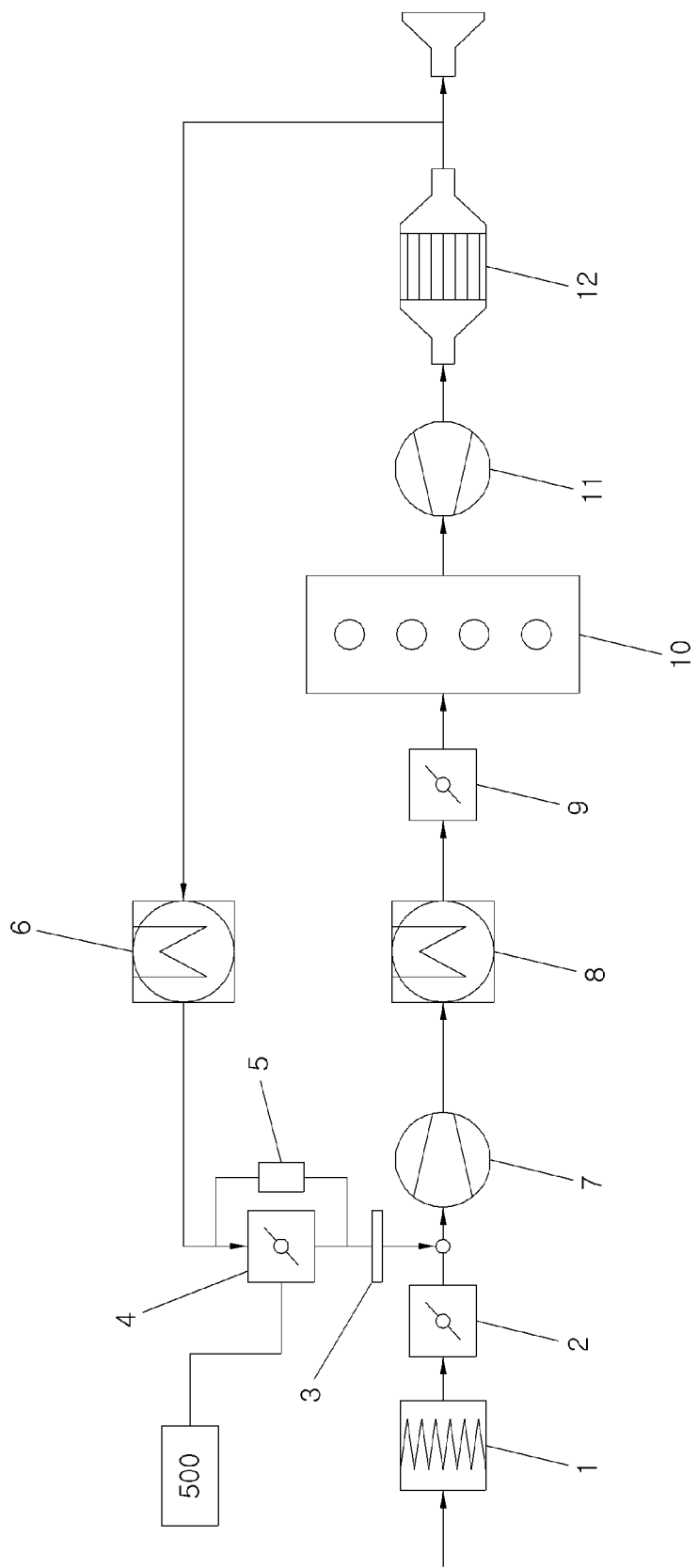
FIG. 1 is a diagram illustrating a configuration of a turbo-engine system that includes a low-pressure EGR system controlled by a control apparatus and method according to embodiments of the present disclosure.

Exemplary embodiments of the present disclosure will be described below in more detail with reference to the accompanying drawings. The present disclosure may, however, be embodied in different forms and should not be construed as limited to embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

FIG. 1 is a diagram illustrating a configuration of a turbo-engine system that includes a low-pressure EGR system controlled by a control apparatus and method according to embodiments of the present disclosure. As illustrated in FIG. 1, the low-pressure EGR system includes an external EGR system that recirculates exhaust gas from the rear end of a catalytic converter 12 for purification thereof to the front end of a compressor 7.

The turbo-engine system is first supplied with outside air, and the inflow rate of outside air thereinto is measured by a hot-film mass air flow (HFM) sensor 1. The introduced outside air is compressed and supercharged by the compressor 7 of a turbocharger. The supercharged air is cooled to a predetermined temperature by an intercooler 8.

The air cooled by the intercooler 8 is introduced into an evaporator and mixes with fuel supplied from a fuel tank (not shown) to form a mixture. The supply rate of air to the evaporator is regulated by a throttle valve 9. The mixture of air and fuel is supplied to a combustion chamber within a cylinder 10 of an engine according to the operation of a piston and an intake valve in the cylinder 10, and is compressed by the piston for combustion.

The exhaust gas generated by combustion in the combustion chamber within the cylinder 10 is discharged from the cylinder 10 to an exhaust port. Here, a portion of the discharged exhaust gas is introduced into a turbine 11 of the turbocharger to rotate the turbine 11, and fresh air is supercharged by the compressor 7 that is coaxially connected to the turbine 11, as described above.

The discharged exhaust gas is post-treated by the catalytic converter 12 and is then discharged to the outside.

Meanwhile, the turbo-engine system includes the low-pressure EGR system including the external EGR system that extracts a portion of exhaust gas discharged to an exhaust system and supplies the extracted exhaust gas to an intake system of the engine for recirculation of exhaust gas. Since the low-pressure EGR system recirculates exhaust gas from the turbocharger, it may supply a large amount of exhaust gas without deterioration of turbo efficiency even in driving conditions of high speed and high load, thereby having an effect of reducing NOx and improving fuel efficiency.

As illustrated in FIG. 1, the external EGR system of the low-pressure EGR system includes a low-pressure EGR valve 4 that regulates a recirculation rate of exhaust gas to the intake system, and an EGR cooler 6 that cools high-temperature exhaust gas recirculated through an EGR path to introduce the exhaust gas into the engine through the intake system.

The external EGR system includes a differential pressure generation valve 2 that is located downstream of the low-pressure EGR valve 4 in the flow direction of exhaust gas and is located upstream of the compressor 7 in the flow direction of air to control the pressure of introduced air at the corresponding position. The differential pressure generation valve 2 is installed to lower pressure at the rear end of the low-pressure EGR valve 4 and the upper end of the compressor 7 in order to increase the inflow rate of external EGR gas. The differential pressure generation valve 2 is fully open in a normal condition, in which case when the amount of EGR is decreased while EGR is being performed, the differential pressure generation valve 2 is closed at a predetermined opening degree to increase the flow rate of EGR. Meanwhile, the differential pressure between upstream and downstream sides of the low-pressure EGR valve 4 is detected by a differential pressure sensor 5.

An exhaust temperature sensor 3 is installed between the low-pressure EGR valve 4 and the compressor 7, and measures the temperature of exhaust gas that is recirculated from the exhaust system to the intake system.

As will be described later, the opening degree of the low-pressure EGR valve and the timings of the intake and exhaust valves are controlled by a controller 500 of the apparatus for controlling a low-pressure EGR valve according to an embodiment of the present disclosure.

The low-pressure EGR system, which is described above and illustrated in FIG. 1, is the external EGR system that recirculates exhaust gas discharged to the exhaust system to the front end of the compressor 7. Meanwhile, when the exhaust valve disposed in the cylinder 10 of the engine is reopened during an intake stroke, a portion of the combustion gas discharged from the cylinder 10 to the exhaust port may be reintroduced into the cylinder 10. Hereinafter, the system performing the above process is referred to as an internal EGR system that is separated from the external EGR system illustrated in FIG. 1.

As described above, since the internal EGR system serves to reintroduce a portion of exhaust gas into the cylinder 10 through the exhaust port when the exhaust valve is opened during the intake stroke, in which the intake valve is opened, namely during a valve overlap, the amount of internal EGR is related to the degree of the valve overlap. In addition, the timings of the intake and exhaust valves must be controlled in an advance or retard direction in order to adjust the valve overlap. To this end, FIG. 2 illustrates a continuously variable valve timing apparatus.

Figure 2:
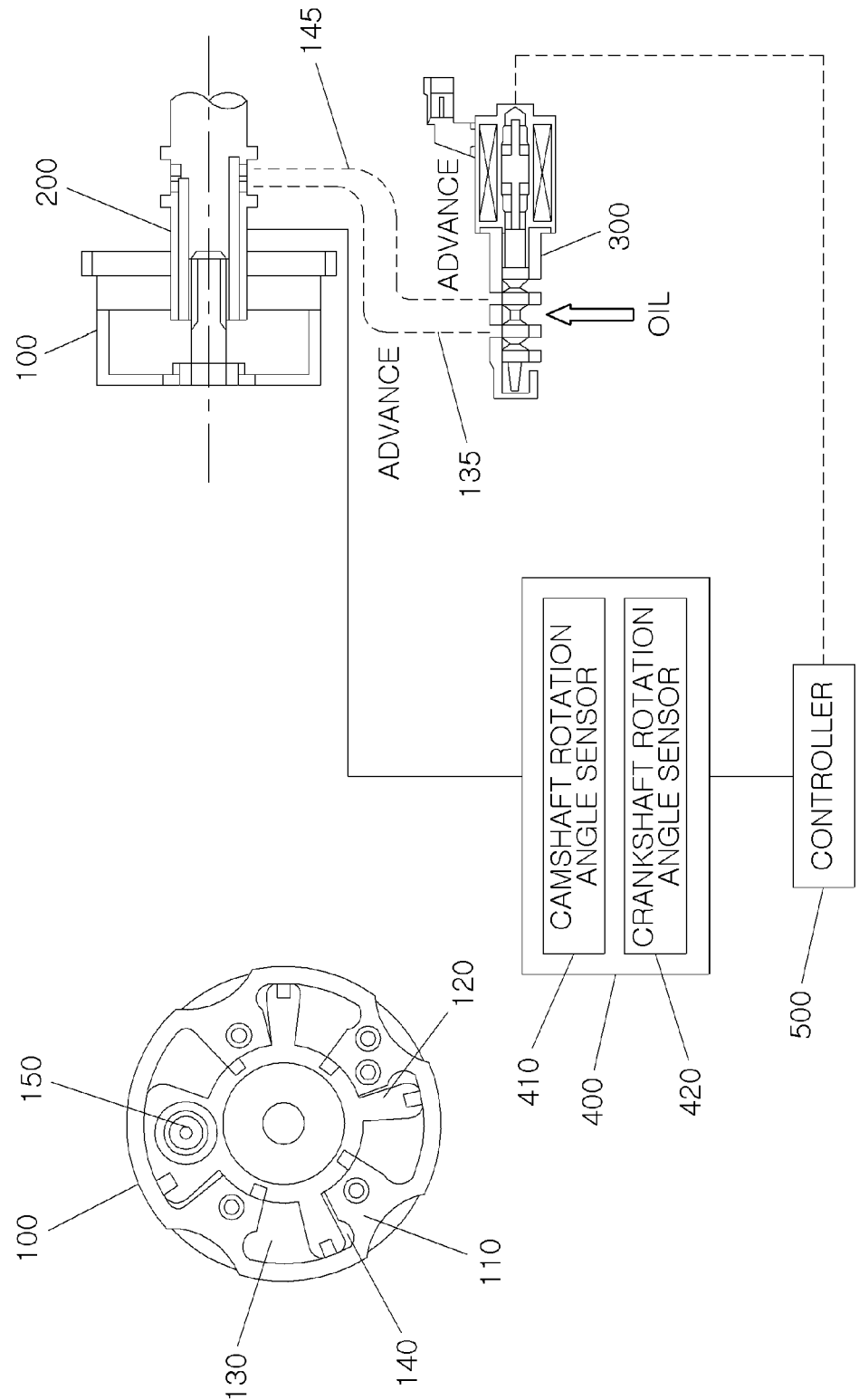
FIG. 2 is a view illustrating a configuration of a continuously variable valve timing apparatus to adjusting timings of intake and exhaust valves by the control apparatus and method according to embodiments of the present disclosure.

Referring to FIG. 2, the continuously variable valve timing apparatus includes a variable valve device 100 connected to one end of a camshaft 200, an oil control valve 300, a crank angle and cam angle detector 400, and the controller 500 that controls these components.

In addition, the variable valve device 100 includes a housing 110, and a rotor vane 120 that is connected to one end of the camshaft 200 of an intake/exhaust valve (not shown) and is inserted into the inner periphery of the housing 110.

The housing 110 has a plurality of advance and retard chambers 130 and 140 that are formed therein as spaces divided by respective vanes of the rotor vane 120. A lock device 150, which fixes a phase of rotation of the camshaft 200 relative to a crankshaft (not shown) of an internal combustion engine at a specific angle, is formed in at least a portion of the vanes of the rotor vane 120.

The continuously variable valve timing apparatus regulates the supply rate of oil that is supplied from the oil control valve 300 to the advance and retard chambers 130 and 140 of the variable valve device 100 through advance and retard passages 135 and 145, so as to vary a valve timing by changing the phase of rotation of the camshaft 200 relative to the crankshaft between the most advanced phase and the most retarded phase.

In more detail, when the valve timing is changed to be advanced, the oil control valve 300 blocks the retard passage 145 through which oil is supplied to the retard chambers 140, and, on the other hand, opens the advance passage 135 according to duty control for supply of oil to the advance chambers 130 to advance the phase of the camshaft by changing the hydraulic pressure in the advance chambers 130.

In addition, when the valve timing is changed to be retarded, the oil control valve 300 blocks the advance passage 135 through which oil is supplied to the advance chambers 130, and, on the other hand, opens the retard passage 145 according to duty control for supply of oil to the retard chambers 140 to retard the phase of the camshaft by changing the hydraulic pressure in the retard chambers 140.

For control of the continuously variable valve timing apparatus, the controller 500 calculates an optimum valve timing according to the speed (RPM) range of the engine to set a desired valve timing based on the same. The controller 500 calculates the angle that is required to change the phase of rotation of the camshaft 200 so as to reach the desired valve timing, and controls the oil control valve 300 based on the same. In the apparatus for controlling a low-pressure EGR system according to an embodiment of the present disclosure, the controller 500 performs timing control for adjusting the phase of rotation of the camshaft 200 of the intake/exhaust valve in order to decrease the amount of internal EGR by reducing the valve overlap according to a predetermined condition when the low-pressure EGR is stopped or the amount of external EGR is decreased.

Figure 3:
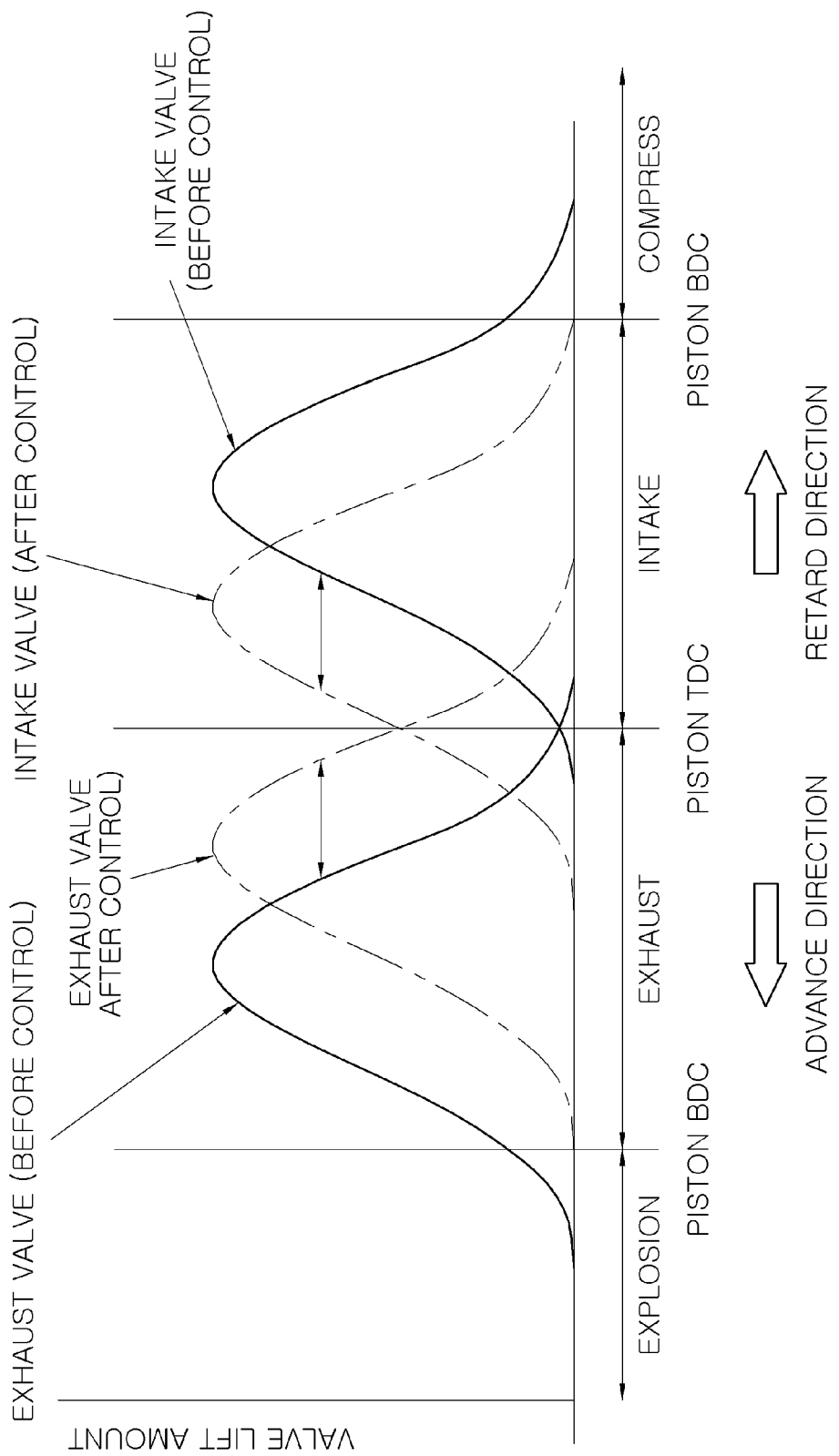
FIG. 3 is a view schematically illustrating timings of intake and exhaust valves.

As illustrated in FIG. 3, it is possible to advance or retard the timings of the intake and exhaust valves using the continuously variable valve timing apparatus illustrated in FIG. 2. In particular, when the exhaust valve is advanced by a predetermined angle while the intake valve is retarded by a predetermined angle, the valve overlap between the intake valve and the exhaust valve is reduced. Thus, the amount of internal EGR is also decreased based on the valve overlap.

FIG. 4 is a block diagram illustrating a configuration of the apparatus for controlling a low-pressure EGR system according to an embodiment of the present disclosure.

Referring to FIG. 4, the apparatus for controlling a low-pressure EGR system according to an embodiment of the present disclosure includes a driving information detector that detects a driving state of the vehicle, an EGR amount detector that detects an amount of external EGR controlled by the low-pressure EGR valve 4, and the controller 500 that controls the low-pressure EGR valve 4 and the intake and exhaust valves of the engine, based on the result detected by the driving information detector and the EGR amount detector.

The driving information detector detects at least one of an opening degree of a vehicle accelerator pedal, a vehicle speed, an engine speed (RPM), and an opening degree of a throttle valve to detect a current driving state of the vehicle.

The EGR amount detector includes an external EGR amount measurement unit, and the external EGR amount measurement unit detects an amount of external EGR, based on the opening degree of the low-pressure EGR valve 4, the temperature of exhaust gas measured by the exhaust temperature sensor 3, the differential pressure between the upstream and downstream sides of the low-pressure EGR valve 4 measured by the differential pressure sensor 3, the amount of EGR gas and air measured therethrough, and the like.

The EGR amount detector may further include an internal EGR amount measurement unit that measures an amount of internal EGR based on the valve overlap between the intake valve and the exhaust valve, the amount of air in the cylinder, and the like.

The controller 500 determines a desired amount of external EGR and a desired amount of internal EGR, based on the information measured by the driving information detector and the EGR amount detector, and generates a control duty for controlling the low-pressure EGR valve 4 and the continuously variable valve timing apparatus in order to accomplish a desired rate of EGR.

The control method performed by the controller 500 of the low-pressure EGR system will be described in detail with referent to FIG. 5A and FIG. 5B.

Figure 5A:
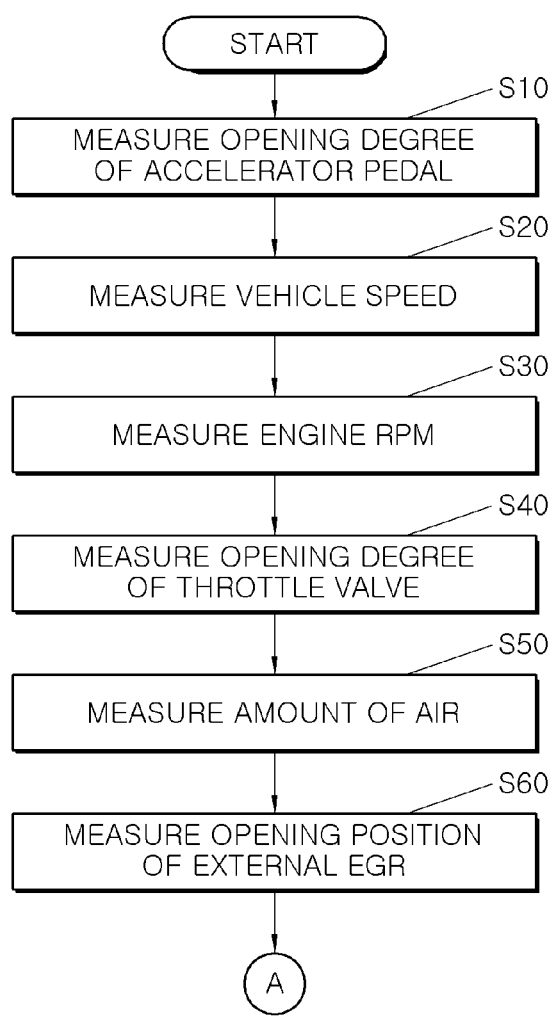
FIGS. 5A and 5B are a flowchart illustrating the method of controlling a low-pressure EGR system according to an embodiment of the present disclosure.
Figure 5B:
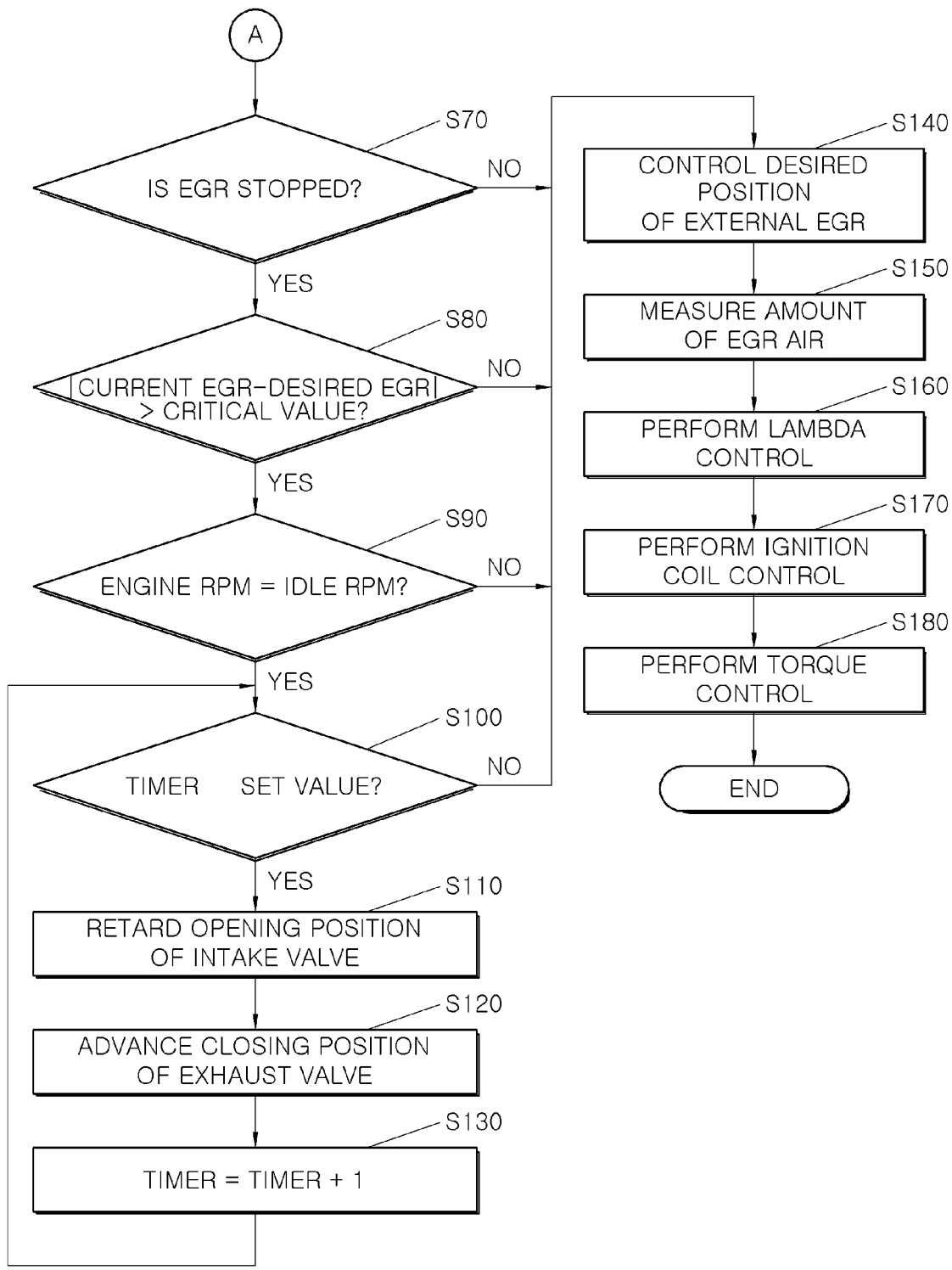

FIG. 5A and FIG. 5B a flowchart illustrating the method of controlling a low-pressure EGR system according to an embodiment of the present disclosure, which is performed by the controller illustrated in FIG. 4.

First, the driving information detector detects an opening degree of an accelerator pedal, a vehicle speed, an engine speed (RPM), and an opening degree of the throttle valve 9 (S10 to S40). The controller 500 determines a desired rate of external EGR obtained by controlling the opening degree of the low-pressure EGR valve 4, from a preset map using the detection information such as the opening degree of the accelerator pedal, the vehicle speed, the engine RPM, and the opening degree of the throttle valve 9.

Meanwhile, the current amount of air supplied to the intake system is measured through the opening degree of the throttle valve 9 (S50) and the current opening degree of the low-pressure EGR valve 4 is measured (S60), in order for the controller 500 to determine a current rate of EGR through the external EGR in which exhaust gas is supplied from the downstream of the catalytic converter 12 of the exhaust system via the low-pressure EGR valve 4 to the upstream of the compressor 7. It is possible to more accurately determine the current rate of EGR, based on the measurement information such as the detected vehicle driving information, the differential pressure between the upstream and the downstream of the low-pressure EGR valve 4 measured by the differential pressure sensor 5, and the temperature of EGR gas measured by the exhaust temperature sensor 3.

Figure 8:
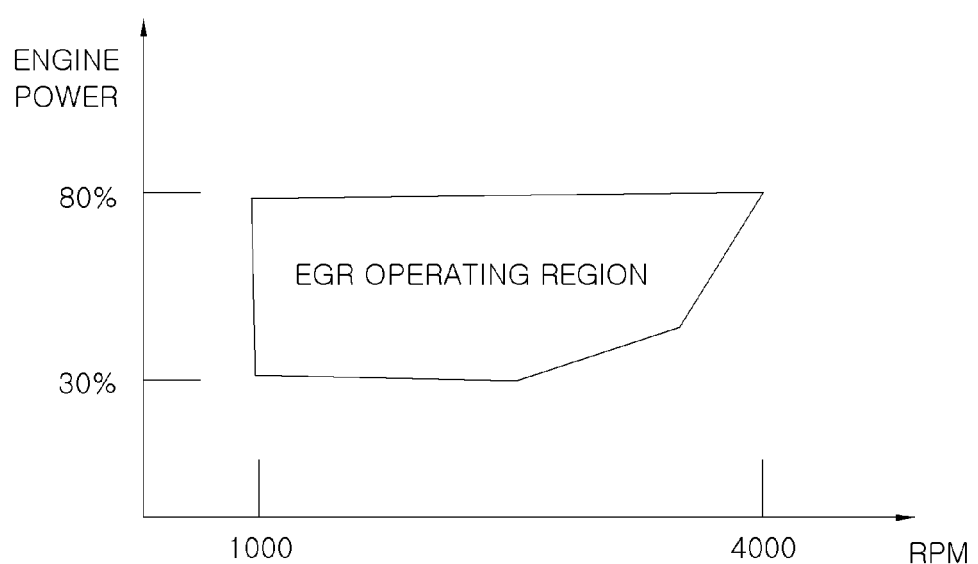
FIG. 8 is a graph illustrating an operating region of a low-pressure EGR system.

Next, the controller 500 determines whether or not to stop the EGR, based on the information acquired in the previous steps. If the current driving conditions of the vehicle are not suitable for the execution of the EGR or are out of the operating region of EGR illustrated in FIG. 8, the controller 500 transmits the control duty, which allows the desired rate of EGR to be 0% (i.e., the amount of external EGR is controlled to be "0"), to the low-pressure EGR valve 4 to stop the EGR.

If the controller 500 determines that it is necessary to stop the execution of the EGR, based on the information acquired in the previous steps, the execution of the EGR is stopped. In this case, the controller 500 determines whether or not the difference between the current rate of EGR measured in steps S50 and S60 and the desired rate of EGR detected based on the driving information detected in steps S10 to S40 exceeds a predetermined critical value (S80). When the difference between the desired rate of EGR and the current rate of EGR exceeds the predetermined critical value, a predetermined delay time exists until the amount of external EGR is "0", as in the above-mentioned example (the desired rate of EGR is 0% and the current rate of EGR is 10%) of FIG. 7. The exhaust gas, which is on the external circulation path of EGR gas, is continuously introduced into the cylinder 10 by inertia, even though the opening degree of the low-pressure EGR valve 4 is 0% during the delay time so that the low-pressure EGR valve 4 is fully closed. The greater the difference between the desired rate of EGR and the current rate of EGR, the greater the delay time.

The unnecessary inflow of external EGR gas causes combustion instability, which may lead to an accidental fire and a start-off phenomenon. Accordingly, to resolve the combustion instability, the method of controlling a low-pressure EGR system according to an embodiment of the present disclosure performs an additional compensation for the unnecessary inflow of external EGR gas by decreasing the amount of internal EGR introduced into the cylinder 10 through the exhaust port, which will be described later.

Accordingly, the controller 500 determines whether or not the difference between the desired rate of EGR and the current rate of EGR exceeds a predetermined value in step S80, and determines whether or not to execute control for decreasing the amount of internal EGR (S100 to S130), which will be described later.

Prior to the execution of the control for decreasing the amount of internal EGR (S100 to S130), the controller 500 determines whether or not the engine speed is in an idle RPM range (S90). During the valve overlap between the intake valve and the exhaust valve, there occurs scavenging in which a fresh air component supplied through the intake port is directly transmitted to the exhaust port. The scavenging is generally used to improve fuel filling efficiency and torque. Thus, if the valve overlap is reduced to decrease the amount of internal EGR, the above effect of improving torque using the scavenging is reduced. Meanwhile, as illustrated in FIG. 7, the time required until the amount of external EGR introduced into the cylinder 10 is completely "0" is increased as the engine speed is lowered, thereby considerably affecting combustion instability. Accordingly, the controller 500 performs the control for decreasing the amount of internal EGR (S100 to S130) only when the engine speed corresponds to an idle RPM.

When it is determined that the engine speed is in the idle RPM range, the controller 500 performs the control for decreasing the amount of internal EGR (S100 to S130). To this end, the controller 500 controls the oil control valve 300 of the continuously variable valve timing apparatus to retard the opening position of the intake valve by a predetermined angle (S110) while advancing the closing position of the exhaust valve by a predetermined angle (S120). It is preferable for maintenance of combustion stability to respectively retard and advance the intake and exhaust valves in the range of 0 to 5° from the TDC (Top Dead Center) of the engine piston.

Figure 6A:
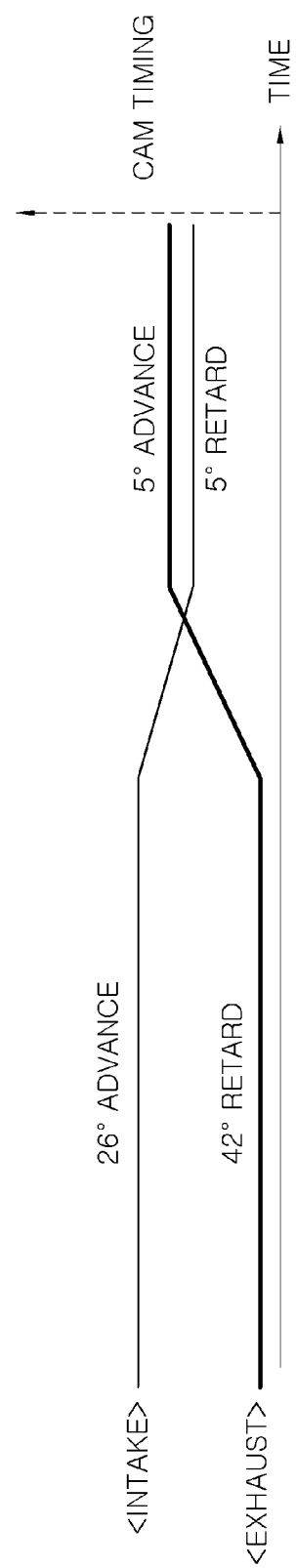
FIGS. 6A to 6C are schematically views illustrating changes in timing of intake and exhaust valves in the method of controlling a low-pressure EGR system according to an embodiment of the present disclosure.
Figure 6B:
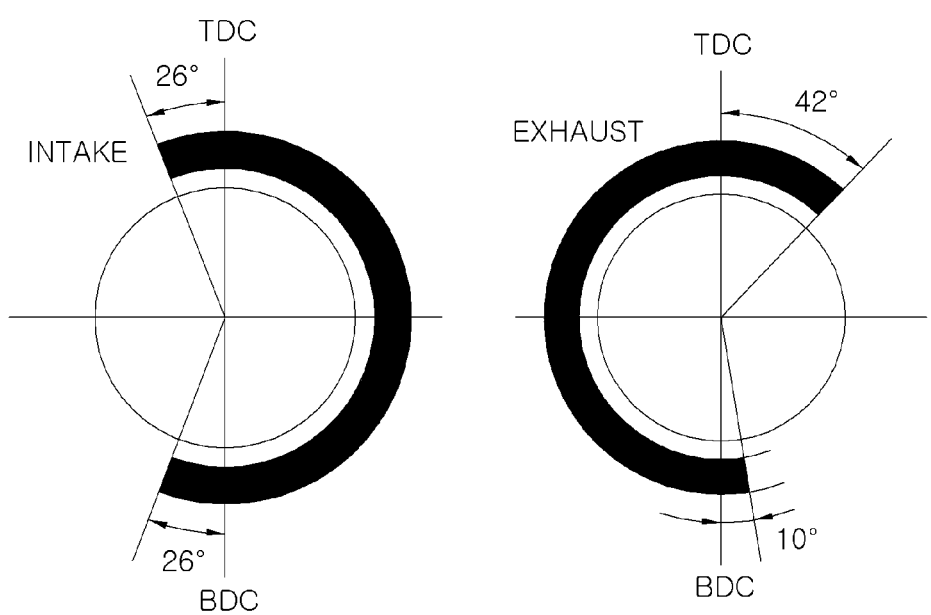
Figure 6C:
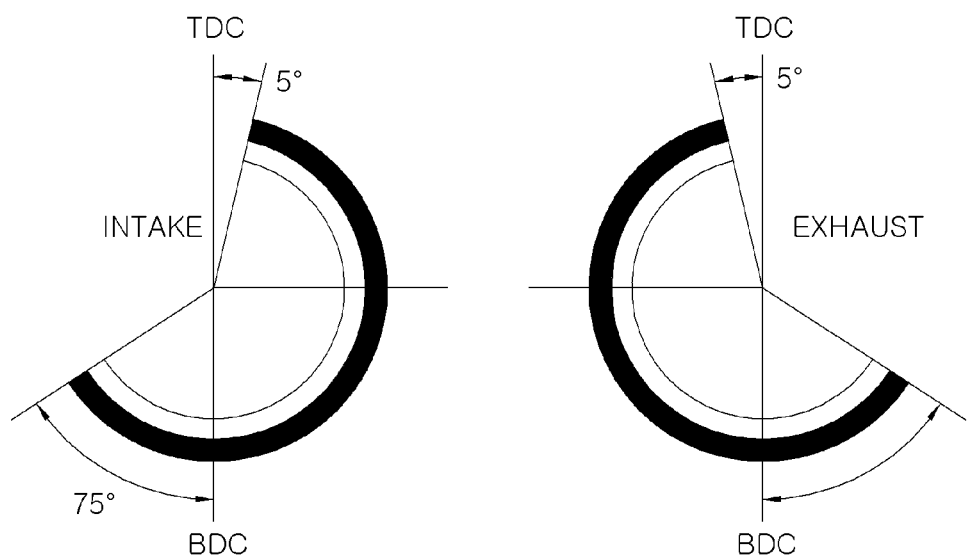

FIGS. 6A to 6C are schematic views illustrating changes in timing of intake and exhaust valves in the method of controlling a low-pressure EGR system according to an embodiment of the present disclosure. In the valve timing illustrated in FIGS. 6A to 6C, the valve overlap, in which the timing of the intake valve is advanced from the TDC of the engine piston by an angle of 26° and the timing of the exhaust valve is retarded from the TDC of the engine piston by an angle of 42°, is formed before the control for decreasing the amount of internal EGR. When the control for decreasing the amount of internal EGR is performed by the control method according to an embodiment of the present disclosure, the timing of the intake valve is retarded from the TDC of the engine piston by an angle of 5° and the timing of the exhaust valve is advanced from the TDC of the engine piston by an angle of 5° so that the valve overlap is reduced.

Meanwhile, the control for decreasing the amount of internal EGR through the advance and retard control of the intake and exhaust valves is performed for the delay time required until the amount of external EGR is completely "0" when the EGR is stopped. Accordingly, the time required to perform the control for decreasing the amount of internal EGR is measured (S130), and the controller 500 determines whether or not the required time exceeds a set value corresponding to the delay time (S100). As illustrated in FIG. 7, the delay time required until the amount of external EGR is completely "0" when the EGR is stopped varies depending on the current speed of the engine. In an example illustrated in FIG. 7, the delay time is about 0.9 seconds when the engine speed is 1500 rpm, whereas the delay time is about 0.6 seconds when the engine speed is 3000 rpm. The predetermined set value corresponding to the delay time is determined according to the current speed of the engine.

When it is determined that the control for decreasing the amount of internal EGR is performed for the set time corresponding to the delay time or there is no need to perform the control for decreasing the amount of internal EGR, the controller 500 controls the low-pressure EGR system to accomplish a desired rate of EGR (S140). To this end, the controller 500 applies a control duty for accomplishing a desired rate of EGR to the low-pressure EGR valve 4 to adjust the opening degree thereof.

After the controller 500 controls the low-pressure EGR system to accomplish the desired rate of EGR, the external EGR amount measurement unit measures an amount of EGR air (S150). The controller 500 controls the throttle valve 9, based on the measured amount of EGR air and vehicle driving information, and controls an excess air ratio $\lambda$. To improve fuel efficiency and reduce exhaust gas, the ratio between air and fuel supplied to the engine is controlled such that the excess air ratio is "1" ($\lambda=1$), namely the actual amount of suctioned air corresponds to an amount of air required for complete combustion in theory.

The controller 500 controls an ignition coil of the engine (S170) to control an optimum ignition timing, based on the current rate of EGR, and controls the output torque of the engine (S180) according to the predetermined map, based on the current rate of EGR.

Although the embodiment illustrated in FIG. 5A and FIG. 5B describes the control for decreasing the amount of internal EGR to secure combustion stability when the EGR is stopped, the present disclosure is not limited thereto. In the case where the rate of EGR is intended to be reduced according to the driving situation even though the EGR is not stopped, when the difference between the desired rate of EGR and the current rate of EGR exceeds a predetermined critical value for stable combustion, external EGR air that exceeds the same desired amount of external EGR as that illustrated in FIG. 7 may be unnecessarily introduced into the cylinder 10, thereby causing problems relating to start-off.

Accordingly, since the additional compensation for the unnecessary inflow of the external EGR gas is performed by the control for decreasing the amount of internal EGR (S100 to S130) in the present disclosure even in the above case, it is possible to secure combustion stability.

In accordance with exemplary embodiments of the present disclosure, it is possible to prevent combustion instability caused by unnecessary inflow of EGR gas into a cylinder when EGR in a low-pressure EGR system is stopped.

In addition, it is possible to prevent a start-off phenomenon due to excessive supply of external EGR gas by reducing a valve overlap in a certain section when the difference between a desired amount of EGR and a current amount of EGR is a predetermined value or more during the reduction of external EGR according to the driving section.

While the present disclosure has been described with respect to the specific embodiments, it will be apparent to those skilled in the art that various changes and modifications may be made without departing from the spirit and scope of the disclosure as defined in the following claims.

What is claimed is:

1. An apparatus for controlling a low-pressure exhaust gas recirculation (EGR) system, comprising:
    a driving information detector configured to detect a vehicle driving state;
    an EGR amount detector configured to detect an amount of external EGR, which is recirculated from a rear end of a catalytic converter for purifying an exhaust gas into an engine through an external circulation path and controlled by a low-pressure EGR valve; and
    a controller configured to control the low-pressure EGR valve and intake and exhaust valves of the engine, based on a result detected by the driving information detector and the EGR amount detector,
    wherein the controller controls timings of the intake and exhaust valves such that a valve overlap is reduced in order to decrease an amount of internal EGR introduced into a cylinder through the exhaust valve from an exhaust port by the valve overlap for a predetermined time when the amount of external EGR is decreased,
    the predetermined time is varied according to an engine speed detected by the driving information detector, and
    the predetermined time is a time required for the amount of external EGR introduced into the cylinder through the external circulation path to be reduced to a predetermined value.

2. The apparatus of claim 1, wherein when the amount of external EGR is changed to "0" by stop of low-pressure EGR, the controller controls the timings of the intake and exhaust valves to decrease the amount of internal EGR.

3. The apparatus of claim 1, wherein the control for decreasing the amount of internal EGR is performed by retarding the timing of the intake valve and advancing the timing of the exhaust valve to reduce the valve overlap.

4. The apparatus of claim 3, wherein the valve overlap is reduced by retarding the timing of the intake valve from a top dead center by a predetermined angle and advancing the timing of the exhaust valve from the top dead center by a predetermined angle.

5. The apparatus of claim 4, wherein the angle of retard of the intake valve and the angle of advance of the exhaust valve are in a range of 0° to 5°.

6. The apparatus of claim 1, wherein the driving information detector detects at least one of an opening degree of a vehicle accelerator pedal, a vehicle speed, the engine speed (RPM), and an opening degree of a throttle valve.

7. The apparatus of claim 1, wherein the control for decreasing the amount of internal EGR is performed when a difference between a current rate of EGR and a desired rate of EGR based on the amount of external EGR detected by the EGR amount detector exceeds a critical value.

8. The apparatus of claim 1, wherein the control for decreasing the amount of internal EGR is performed when the engine speed is in an idle RPM range.

9. The apparatus of claim 1, wherein the controller controls an ignition timing of an ignition coil and a torque by applying a control duty corresponding to a desired rate of EGR to the low-pressure EGR valve and detecting an amount of EGR air in low-pressure EGR using the EGR amount detector.

10. The apparatus of claim 9, wherein the controller controls a ratio between fuel and air supplied to the engine such that an excess air ratio ($\lambda$) is "1".

* * * * *